US012620405B2

(12) United States Patent
Bao et al.

(10) Patent No.: US 12,620,405 B2
(45) Date of Patent: May 5, 2026

(54) SIGNAL PROCESSING METHOD AND ELECTRONIC DEVICE

(71) Applicant: HUAWEI TECHNOLOGIES CO., LTD., Guangdong (CN)

(72) Inventors: Guangzhao Bao, Shanghai (CN); Liwen Chen, Shanghai (CN); Lei Huang, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 341 days.

(21) Appl. No.: 18/247,212

(22) PCT Filed: Sep. 17, 2021

(86) PCT No.: PCT/CN2021/118948
§ 371 (c)(1),
(2) Date: Mar. 29, 2023

(87) PCT Pub. No.: WO2022/068608
PCT Pub. Date: Apr. 7, 2022

(65) Prior Publication Data
US 2023/0386494 A1 Nov. 30, 2023

(30) Foreign Application Priority Data
Sep. 30, 2020 (CN) ........................ 202011065346.1

(51) Int. Cl.
*G10L 21/028* (2013.01)
*G10L 21/0216* (2013.01)
*G10L 25/57* (2013.01)

(52) U.S. Cl.
CPC ........ *G10L 21/028* (2013.01); *G10L 21/0216* (2013.01); *G10L 25/57* (2013.01)

(58) Field of Classification Search
CPC .... G10L 21/028; G10L 21/0216; G10L 25/57
See application file for complete search history.

(56) References Cited

U.S. PATENT DOCUMENTS 11,044,567 B1 * 6/2021 Li ........................... G10L 25/51
12,075,210 B2 * 8/2024 Lepoutre ................ G01S 3/805
(Continued)

FOREIGN PATENT DOCUMENTS

CN 106328156 A 1/2017
CN 107146614 A 9/2017
(Continued)

OTHER PUBLICATIONS

Cutler, et al. "Look Who's Talking: Speaker Detection Using Video and Audio Correlation", 2000, IEEE International Conference on Multimedia and Expo 2000 New York, New York, p. 1-4 (Year: 2000).*
(Continued)

*Primary Examiner* — Bhavesh M Mehta
*Assistant Examiner* — Eunice Lee
(74) *Attorney, Agent, or Firm* — Fish & Richardson P.C.

(57) ABSTRACT

Example signal processing methods and example electronic devices are disclosed. One example method is applied to an electronic device, where the electronic device includes a microphone array and a camera. The example method includes performing sound source localization on a first audio signal obtained by using the microphone array, to obtain sound source direction information. A first video obtained by using the camera is processed to obtain user direction information. A target sound source direction is determined based on the sound source direction information and the user direction information. A user lip video is obtained in the target sound source direction by using the camera. A second audio signal is obtained by using the microphone array. A third audio signal is obtained based on the second audio signal and the user lip video by using a voice quality enhancement model.

20 Claims, 8 Drawing Sheets

(56) References Cited

U.S. PATENT DOCUMENTS

| | | | | |
|---|---|---|---|---|
| 2002/0105598 | A1* | 8/2002 | Tai | H04N 7/15<br>348/E7.083 |
| 2004/0267521 | A1* | 12/2004 | Cutler | G10L 25/78<br>704/E11.003 |
| 2015/0039314 | A1 | 2/2015 | Lerbakken | |
| 2017/0070835 | A1* | 3/2017 | Silva | G11B 27/034 |
| 2017/0364752 | A1* | 12/2017 | Zhou | G06V 10/462 |
| 2021/0398539 | A1* | 12/2021 | Wexler | G06F 16/5846 |
| 2023/0328429 | A1* | 10/2023 | Bian | H04N 21/4788 |
| 2023/0335148 | A1* | 10/2023 | Lu | G10L 21/0272 |

FOREIGN PATENT DOCUMENTS

| | | | | |
|---|---|---|---|---|
| CN | 107993671 A | | 5/2018 | |
| CN | 108346427 A | | 7/2018 | |
| CN | 108615534 A | | 10/2018 | |
| CN | 208724111 U | | 4/2019 | |
| CN | 106328126 B | | 8/2019 | |
| CN | 110379439 A | | 10/2019 | |
| CN | 110503957 A | | 11/2019 | |
| CN | 110570862 A | | 12/2019 | |
| CN | 110691196 A | | 1/2020 | |
| CN | 111028842 A | | 4/2020 | |
| CN | 111326152 A | | 6/2020 | |
| CN | 112088315 A | * | 12/2020 | G10L 17/10 |
| CN | 113196803 A | * | 7/2021 | H04R 25/407 |

OTHER PUBLICATIONS

Extended European Search Report in European Appln. No. 21874269.0, mailed on Jan. 2, 2024, 7 pages.

International Search Report and Written Opinion in International Appln. No. PCT/CN2021/118948, mailed on Dec. 17, 2021, 21 pages (with English translation).

* cited by examiner

SIGNAL PROCESSING METHOD AND ELECTRONIC DEVICE

CROSS-REFERENCE TO RELATED APPLICATIONS

This application is a national stage of International Application No. PCT/CN2021/118948, filed on Sep. 17, 2021, which claims priority to Chinese Patent Application No. 202011065346.1, filed on Sep. 30, 2020. Both of the aforementioned applications are hereby incorporated by reference in their entireties.

TECHNICAL FIELD

Embodiments of this application relate to the acoustics field, and more specifically, to a signal processing method and an electronic device.

BACKGROUND

Currently, an intelligent device such as a smart television, a smart speaker, or a smart electric light can perform far-field sound pickup. For example, a user utters an instruction of "turning off a light" from 5 meters away, and the intelligent device picks up a speech and recognizes the speech, and controls the light to perform a corresponding turn-off action.

In a common far-field sound pickup technology, an audio signal is picked up by using a microphone array, and ambient noise and echo are suppressed by using a beamforming technology and an echo cancellation algorithm, to obtain a clear audio signal. However, there may be various types of noise and interference in an actual environment, for example, noise from cooking and dish washing in a kitchen, noise from a television program, and interference noise from family chatting. In addition, rooms of some families are large and open, or walls are decorated by using materials with a large acoustic reflection coefficient. As a result, reverberation is severe, and sound is likely to be unclear. All these adverse factors cause a great reduction in definition of sound picked up by using the microphone array, greatly reducing a speech recognition rate.

Therefore, a technology needs to be provided to greatly improve speech recognition efficiency.

SUMMARY

Embodiments of this application provide a signal processing method and an electronic device. A target sound source direction in which a user performing speech interaction with an electronic device is located is determined by using an audio signal and based on a video obtained by using a camera. Further, based on a user lip video obtained in the target sound source direction by using the camera and a preset voice quality enhancement model, voice quality enhancement is performed on a picked-up audio signal to obtain or restore a clear audio signal, so that speech recognition efficiency can be greatly improved.

According to a first aspect, a signal processing method is provided, applied to an electronic device. The electronic device includes a microphone array and a camera, and the method includes:

performing sound source localization on a first audio signal obtained by using the microphone array, to obtain sound source direction information;

processing a first video obtained by using the camera, to obtain user direction information;

determining a target sound source direction based on the sound source direction information and the user direction information;

obtaining a user lip video in the target sound source direction by using the camera;

obtaining a second audio signal by using the microphone array; and obtaining a third audio signal based on the second audio signal and the user lip video by using a voice quality enhancement model, where the voice quality enhancement model includes a correspondence between a semantic meaning and a lip shape.

The sound source direction information includes at least one sound source direction, and the at least one sound source direction includes the target sound source direction. The user direction information includes some directions related to a user, for example, includes at least one type of direction related to the user. The target sound source direction is a direction in which a target user performing speech interaction with the electronic device is located, that is, a source direction of sound made by the target user.

The user lip video records a plurality of lip shapes during speech of the user. There is a correspondence between a lip shape and a semantic meaning, that is, one lip shape may correspond to one or more semantic meanings. When the user is not speaking, lips are in a still state. Actually, the user lip video in the target sound source direction may also be understood as a lip video of the target user.

The voice quality enhancement model performs sound pickup enhancement on an audio signal, to enhance an audio signal in the target sound source direction, and suppresses or cancels an audio signal that is in another direction and that is produced by a speaker or background noise, so as to obtain or restore a clear audio signal. The voice quality enhancement model in this embodiment of this application integrates audio and video information, and integrates a correspondence between a semantic meaning and a lip shape, that is, one or more semantic meanings may correspond to one lip shape.

For example, the camera is a rotatable camera. After the target sound source direction is determined, the camera may rotate to the target sound source direction, to record the user lip video in the target sound source direction.

In the signal processing method in this embodiment of this application, the first video is obtained by using the camera, and the target sound source direction is determined based on the first audio signal obtained by using the microphone array, so that estimation accuracy of the target sound source direction can be greatly improved. This prevents a false sound source generated due to strong reflected sound when the target sound source direction is determined only by using an audio signal from interfering with the determining of the target sound source direction. In addition, by using the preset voice quality enhancement model and the user lip video obtained in the target sound source direction by using the camera, voice quality enhancement is performed on the second audio signal obtained by using the microphone array. Because the voice quality enhancement model integrates the correspondence between a semantic meaning and a lip shape, the clean third audio signal can be restored based on the user lip video and the voice quality enhancement model, and finally, speech recognition efficiency can be effectively improved.

With reference to the first aspect, in some implementations of the first aspect, the electronic device further includes a directional microphone, and the method further includes:

obtaining a fourth audio signal in the target sound source direction by using the directional microphone; and the obtaining a third audio signal based on the second audio signal and the user lip video in the target sound source direction by using a voice quality enhancement model includes:

obtaining the third audio signal based on the second audio signal, the fourth audio signal, and the user lip video by using the voice quality enhancement model.

In some embodiments, the directional microphone may be fastened to the camera. In this way, after the target sound source direction is determined, the directional microphone is driven to rotate during rotation of the camera, and finally rotates to the target sound source direction. The camera records the user lip video in the target sound source direction, and the directional microphone picks up the fourth audio signal in the target sound source direction.

In the signal processing method in this embodiment of this application, after the target sound source direction is determined, the fourth audio signal in the target sound source direction is obtained by using the directional microphone. The directional microphone suppresses reverberation, interference beyond the target sound source direction, and echo of a display to some extent, and further suppresses residual echo after echo cancellation is performed. Therefore, in this embodiment of this application, the fourth audio signal obtained in the target sound source direction by using the directional microphone is combined with the second audio signal obtained by using the microphone array, and the two audio signals are used as an audio input. This can greatly improve sound pickup enhancement effects, to improve speech recognition efficiency.

With reference to the first aspect, in some implementations of the first aspect, the user direction information includes at least one of the following types of directions:

a first type of direction, where the first type of direction includes at least one direction in which lips in a moving state are located;

a second type of direction, where the second type of direction includes at least one direction in which a user is located; and a third type of direction, where the third type of direction includes at least one direction in which a user staring at the electronic device is located.

In the signal processing method in this embodiment of this application, in a manner in which the target sound source direction is determined by using the first type of direction, whether lips of a person in an image are moving, that is, whether a person is speaking, is detected by using the first video, so that a scenario in which a person is speaking, for example, in a video, can be effectively excluded. For an electronic device with a display, a scenario in which an interfering user is speaking can also be excluded to some extent. In a manner in which the target sound source direction is determined by using the second type of direction, a user appearing in an image is detected by using the first video, so that another interfering signal that is not initiated by the user can be effectively excluded. For example, an interfering signal initiated by a speaker can be excluded. In a manner in which the target sound source direction is determined by using the third type of direction, whether a user in an image is staring at the electronic device is detected by using the first video. Usually, especially for an electronic device with a display, if a user has an intention to interact with the electronic device, the user initiates a speech instruction to the electronic device in most cases. In this way, the electronic device can well receive the speech instruction, and the user can more quickly learn of whether the electronic device performs execution according to the instruction or obtain some feedbacks from the electronic device. For example, the user initiates a speech instruction to query for weather conditions, and the user needs to view weather conditions displayed on the electronic device.

With reference to the first aspect, in some implementations of the first aspect, the sound source direction information includes at least one sound source direction; and the determining a target sound source direction based on the sound source direction information and the user direction information includes:

combining the at least one sound source direction and the at least one type of direction to obtain at least one combined direction; and determining the target sound source direction from the at least one direction.

In the signal processing method in this embodiment of this application, the at least one sound source direction is combined with the at least one type of direction to determine the target sound source direction, so that calculation can be simplified.

With reference to the first aspect, in some implementations of the first aspect, the determining the target sound source direction from the at least one direction includes:

determining the target sound source direction from the at least one direction based on at least one parameter, where the at least one parameter includes:

total frequency at which each of the at least one direction is detected in the sound source direction and the at least one type of direction;

whether the electronic device has successfully performed speech interaction with a user within a preset time period and a preset angle range corresponding to each direction, where the preset time period is a time period between a current time and a historical time; and an included angle between each direction and a direction perpendicular to a display of the electronic device.

For the parameter "total frequency at which each direction is detected in the sound source direction and the at least one type of direction", it may be understood that a direction with higher total frequency of being detected is more likely to be the target sound source direction. In an ideal case, the direction is basically the target sound source direction.

For the parameter "whether the electronic device has successfully performed speech interaction with a user within a preset time period and a preset angle range corresponding to each direction", angles in the preset angle range corresponding to each direction may include not only an angle corresponding to the direction, but also an angle near the angle. This parameter may be understood as whether the electronic device has successfully performed speech interaction with the user within the preset time period and near an angle corresponding to a specific direction.

The parameter "included angle between each direction and a direction perpendicular to a display of the electronic device" is applicable to an electronic device with a display. This parameter may be understood as whether a user is near a specific direction defined when the electronic device is used in a preset scenario.

In the signal processing method in this embodiment of this application, different parameters are set with reference to specific scenarios, and the target sound source direction is determined from the at least one direction by using the at least one parameter. For a specific electronic device (for example, a smart television), estimation accuracy of a target sound source direction can be further effectively improved, to improve speech recognition efficiency.

With reference to the first aspect, in some implementations of the first aspect, the determining the target sound source direction from the at least one direction based on at least one parameter includes:

determining a confidence of each direction based on the at least one parameter; and determining a direction corresponding to a maximum confidence value in the at least one direction as the target sound source direction.

With reference to the first aspect, in some implementations of the first aspect, the obtaining a second audio signal by using the microphone array includes:

obtaining the second audio signal in the target sound source direction by using the microphone array based on a beamforming technology.

In the signal processing method in this embodiment of this application, the second audio signal is obtained in the target sound source direction by using the beamforming technology, thereby enhancing sound pickup effects, and effectively reducing impact of an interfering signal in another direction on speech recognition efficiency.

With reference to the first aspect, in some implementations of the first aspect, the first audio signal is a wake-up signal.

According to a second aspect, an electronic device is provided, including a microphone array, a camera, and a processor. The processor is configured to:

perform sound source localization on a first audio signal obtained by using the microphone array, to obtain sound source direction information;

process a first video obtained by using the camera, to obtain user direction information;

determine a target sound source direction based on the sound source direction information and the user direction information;

obtain a user lip video in the target sound source direction by using the camera;

obtain a second audio signal by using the microphone array; and obtain a third audio signal based on the second audio signal and the user lip video by using a voice quality enhancement model, where the voice quality enhancement model includes a correspondence between a semantic meaning and a lip shape.

With reference to the second aspect, in some implementations of the first aspect, the electronic device further includes a directional microphone, and the processor is further configured to:

obtain a fourth audio signal in the target sound source direction by using the directional microphone; and the processor is specifically configured to:

obtain the third audio signal based on the second audio signal, the fourth audio signal, and the user lip video by using the voice quality enhancement model.

With reference to the second aspect, in some implementations of the first aspect, the directional microphone is fastened to the camera.

With reference to the second aspect, in some implementations of the first aspect, the user direction information includes at least one of the following types of directions:

a first type of direction, where the first type of direction includes at least one direction in which lips in a moving state are located;

a second type of direction, where the second type of direction includes at least one direction in which a user is located; and a third type of direction, where the third type of direction includes at least one direction in which a user staring at the electronic device is located.

With reference to the second aspect, in some implementations of the first aspect, the sound source direction information includes at least one sound source direction; and the processor is specifically configured to:

combine the at least one sound source direction and the at least one type of direction to obtain at least one combined direction; and determine the target sound source direction from the at least one direction.

With reference to the second aspect, in some implementations of the first aspect, the processor is specifically configured to:

determine the target sound source direction from the at least one direction based on at least one parameter, where the at least one parameter includes:

total frequency at which each of the at least one direction is detected in the sound source direction and the at least one type of direction;

whether the electronic device has successfully performed speech interaction with a user within a preset time period and a preset angle range corresponding to each direction, where the preset time period is a time period between a current time and a historical time; and an included angle between each direction and a direction perpendicular to a display of the electronic device.

With reference to the second aspect, in some implementations of the first aspect, the processor is specifically configured to:

determine a confidence of each direction based on the at least one parameter; and determine a direction corresponding to a maximum confidence value in the at least one direction as the target sound source direction.

With reference to the second aspect, in some implementations of the first aspect, the processor is specifically configured to:

obtain the second audio signal in the target sound source direction by using the microphone array based on a beamforming technology.

With reference to the second aspect, in some implementations of the first aspect, the first audio signal is a wake-up signal.

With reference to the second aspect, in some implementations of the first aspect, the electronic device is a smart television.

According to a third aspect, a chip is provided, including a processor, configured to invoke, from a memory, and run an instruction stored in the memory, so that an electronic device in which the chip is installed performs the method according to the first aspect.

According to a fourth aspect, a computer storage medium is provided, including a processor. The processor is coupled to a memory. The memory is configured to store a program or instructions. When the program or instructions are executed by the processor, the apparatus is enabled to perform the method according to the first aspect.

According to a fifth aspect, this application provides a computer program product. When the computer program product runs on an electronic device, the electronic device is enabled to perform the method according to any one of the implementations of the first aspect.

It may be understood that the electronic device, the chip, the computer storage medium, and the computer program product provided above are all configured to perform a corresponding method provided above. Therefore, for beneficial effects that can be achieved, refer to the beneficial effects of the corresponding method provided above. Details are not described herein again.

DESCRIPTION OF EMBODIMENTS

Figure 1:
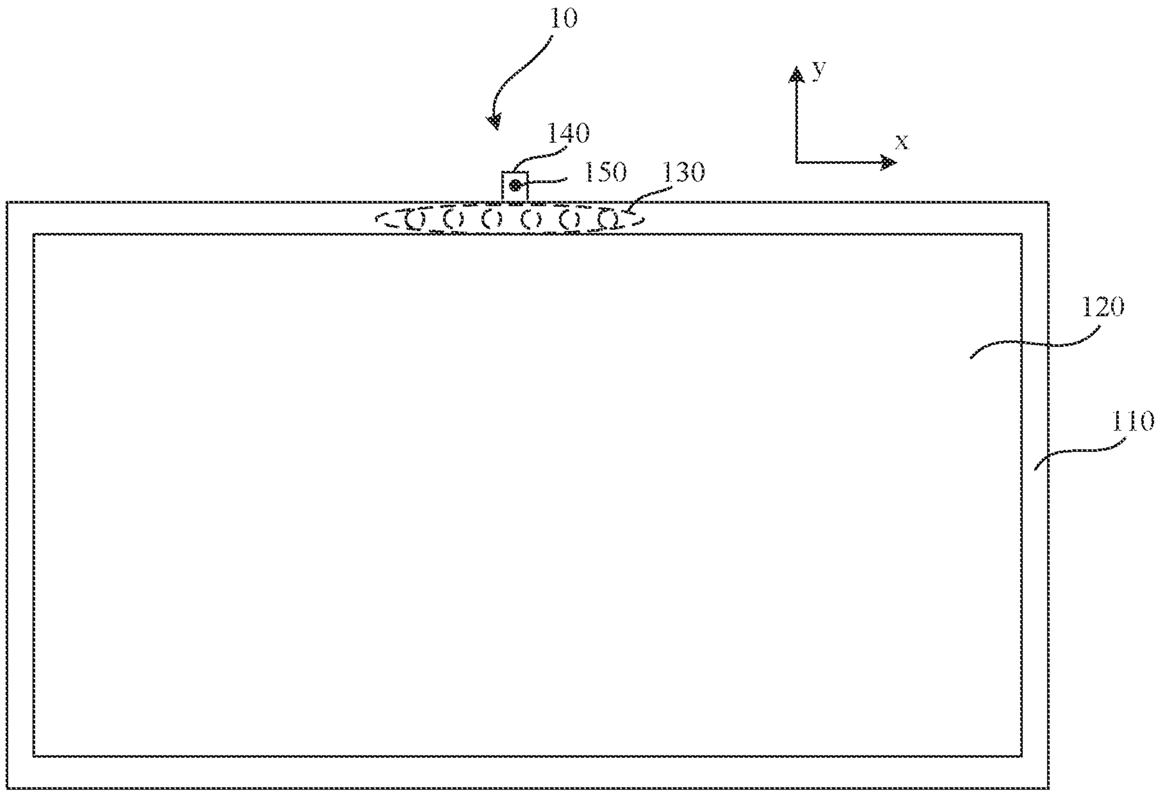
FIG. 1 is a schematic diagram of a structure of an electronic device according to an embodiment of this application.

The following describes technical solutions of this application with reference to accompanying drawings.

In a signal processing method provided in embodiments of this application, a direction (denoted as a target sound source direction) in which a user (denoted as a target user) performing speech interaction with an electronic device is located is determined by using an audio signal and based on a video obtained by using a camera. Further, based on a user lip video obtained in the direction by using the camera and a preset voice quality enhancement model, voice quality enhancement is performed on a picked-up audio signal to obtain or restore a clear audio signal, so that speech recognition efficiency can be greatly improved.

For ease of description, some terms are defined in embodiments of this application. The terms are described below.

Target user: a person who is performing speech interaction with an electronic device, where the target user is initiating, to the electronic device, a speech instruction for performing a specific action. The target user may also be understood as a person who is actually speaking.

Target sound source direction: a direction in which the target user is located, that is, a source direction of sound made by the target user. Due to impact of various interfering signals in an environment, the electronic device may pick up audio signals in a plurality of sound source directions. Therefore, the direction in which the target user is located is defined as the target sound source direction.

User lip video: The user lip video records a shape of lips (denoted as a lip shape) during speech of a user. When the user is speaking, the lips move in various lip shapes, and a lip video may record a plurality of lip shapes. There is a correspondence between a lip shape and a semantic meaning, that is, one lip shape may correspond to one or more semantic meanings. For example, “to”, “too”, and “two” represent three different semantic meanings, but correspond to one lip shape. When the user is not speaking, the lips are in a still state. In embodiments of this application, actually the user lip video in the target sound source direction may also be understood as a lip video of the target user.

The voice quality enhancement model performs sound pickup enhancement on an audio signal, to enhance an audio signal in the target sound source direction, and suppresses or cancels an audio signal that is in another direction and that is produced by a speaker or background noise, so as to obtain or restore a clear audio signal. The voice quality enhancement model in this embodiment of this application integrates audio and video information, and integrates a correspondence between a semantic meaning and a lip shape, and one or more semantic meanings may correspond to one lip shape. In embodiments of this application, an audio signal and a user lip video are used as an input of the voice quality enhancement model. The voice quality enhancement model may perform voice quality enhancement on the audio signal based on the input user lip video and the correspondence between a semantic meaning and a lip shape, to obtain a clear audio signal for speech recognition.

For example, the voice quality enhancement model may perform noise reduction, residual echo cancellation, and dereverberation on the audio signal.

The signal processing method in embodiments of this application may be applied to any electronic device capable of speech recognition. In an example, the electronic device may be a speech-controlled device such as a smart television (also referred to as a smart screen). In another example, the electronic device may be a voice call device such as a mobile phone or a computer.

Figure 2:
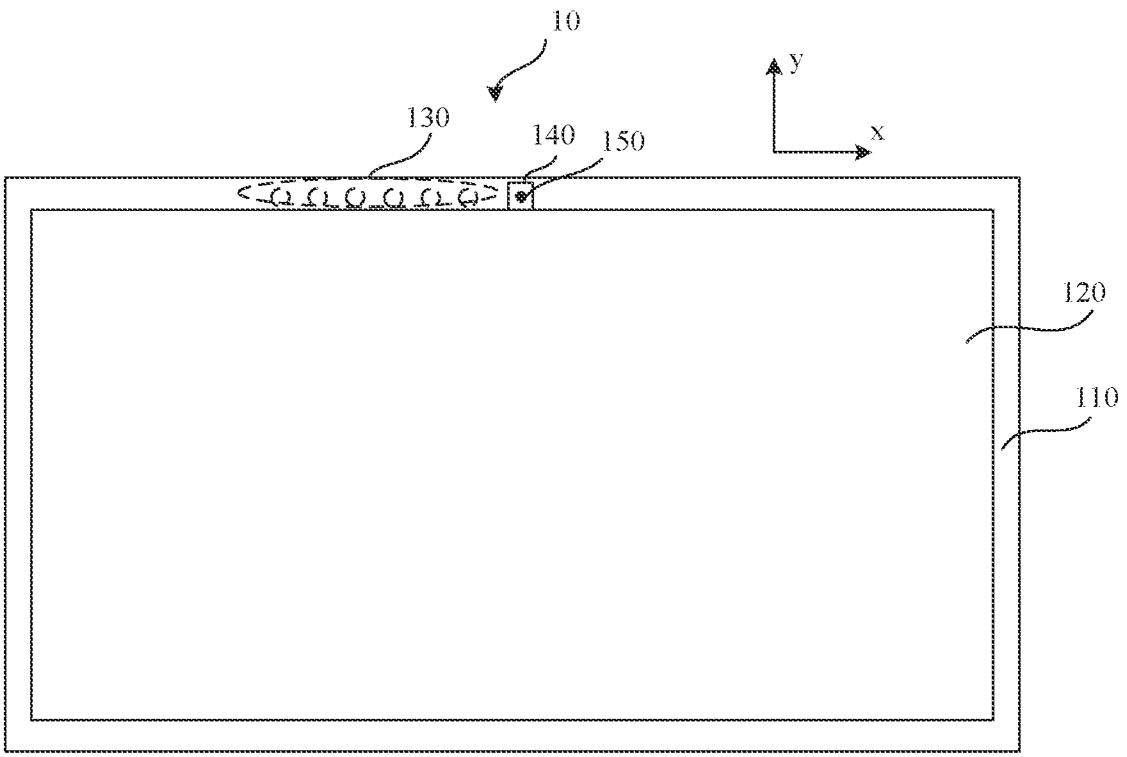
FIG. 2 is a schematic diagram of a structure of an electronic device according to another embodiment of this application.
Figure 3:
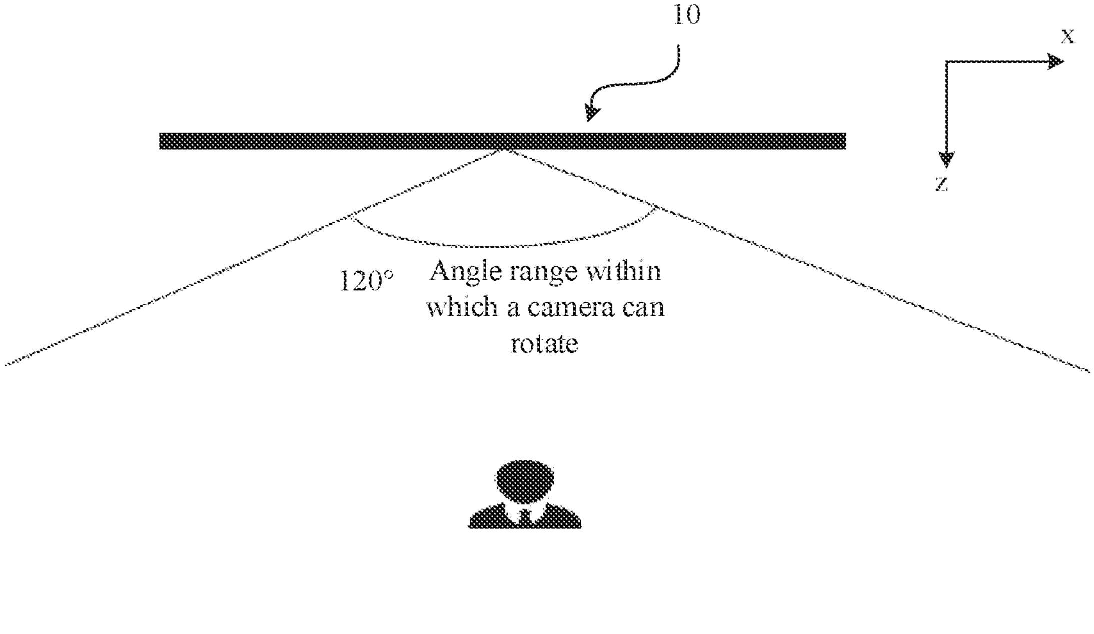
FIG. 3 is a schematic diagram of a scenario in which a camera records a video according to an embodiment of this application.

The following first describes an electronic device in embodiments of this application with reference to FIG. 1 to FIG. 3 by using a smart television as an example.

As shown in FIG. 1, the electronic device 10 includes a housing 110, a display 120, a microphone array 130, and a camera 140. The display 120, the microphone array 130, and the camera 140 are mounted in the housing 110.

The display 120 is configured to display an image, a video, or the like. The display 120 includes a display panel. The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flex light-emitting diode, FLED), a mini-LED, a micro-LED, a micro-OLED, a quantum dot light-emitting diode (quantum dot light emitting diodes. QLED), or the like.

The microphone array 130 is configured to pick up an audio signal, and includes a plurality of microphones and may pick up audio signals in a plurality of directions. For example, the microphones in the microphone array 130 may be omnidirectional microphones, directional microphones, or a combination of an omnidirectional microphone and a directional microphone. This is not limited in this embodiment of this application. An omnidirectional microphone can pick up audio signals in all directions. Regardless of a location of a speaker, sound in all directions is picked up at the same sensitivity. A directional microphone can pick up an audio signal only in a specific direction.

The microphone array 130 may be disposed at any location in the housing 110. This is not limited in this embodiment of this application.

In an example, as shown in FIG. 1, the microphone array 130 is disposed in an area that is in the housing 110 and that is located on one side of the display 120, microphone holes of the microphone array 130 are provided on a front surface of the housing 110, and an orientation of the microphone holes is the same as that of the display 120. The front surface of the housing 110 may be understood as a surface having the same orientation with that of the display 120, or the front surface of the housing 110 may be understood as a surface, facing a user, of the housing 120 when the electronic device is normally used by the user. The microphone array 130 may be disposed in an area that is in the housing 110 and that is located on any side of the display 120. It is assumed that the microphone array 130 shown in FIG. 1 is disposed in an area that is in the housing 110 and that is located on a top side of the display 120. Alternatively, the microphone array 130 may be disposed in an area that is in the housing 110 that is located on another side (for example, a left side, a right side, or a bottom side) of the display 120.

In another example, the microphone array 130 may be disposed in an area that is in the housing 110 and that is located on a top side of the display 120, microphone holes of the microphone array 130 are provided on a top surface (not shown in the figure) of the housing 110, the top surface of the housing 110 is connected to a front surface of the housing 110, and an orientation of the microphone holes is perpendicular to an orientation of the display 120.

In another example, the microphone array 130 may alternatively be disposed on a rear side of the display 120, and microphone holes of the microphone array 130 are provided on the display 120 (not shown in the figure).

In another example, the microphone array 130 may alternatively be disposed on a rear side of the display 120, and microphone holes of the microphone array 130 are provided on a front surface of the housing 110.

The microphone array 130 may be arranged in a linear structure shown in FIG. 1, or may be arranged in another structure. This is not limited in this embodiment of this application. For example, the microphone array 130 may be arranged in a circular structure or a rectangular structure.

The camera 140 is configured to capture a static image or a video. An optical image of an object is generated through a lens, and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to an ISP for converting the electrical signal into a digital image signal. The ISP outputs the digital image signal to a DSP for processing. The DSP converts the digital image signal into an image signal in a standard format, for example, RGB or YUV. In some embodiments, the electronic device 10 may include one or N cameras 130, where N is a positive integer greater than 1.

In this embodiment of this application, the camera 140 may rotate within a preset angle range, to record a video within a specific angle range. The video may be used to determine a target sound source direction. After the electronic device 10 determines the target sound source direction, the camera 140 may rotate to the target sound source direction, so that the camera 140 directly faces the target sound source direction, and a target user is likely displayed at a center of an image, to better record a video in the target sound source direction. An obtained user lip video may be used to process an audio signal that is input to a voice quality enhancement model, to output a clear audio signal for speech recognition.

In an example, as shown in FIG. 1, the camera 140 is disposed on a top surface of the housing 110 and extends out of the top surface, so that rotation of the camera 140 is better implemented. In an embodiment in which the microphone array 130 is located in an area on the top side of the display 120, the camera 140 may be located above the microphone array 130.

In another example, as shown in FIG. 2, the camera 140 may be disposed in an area that is on the front surface of the housing 110 and that is on the top side of the display 120.

The camera 140 may rotate within a preset angle range, and the preset angle range may be an angle in any range. As shown in FIG. 3, in an embodiment in which the electronic device 10 is a smart television, an angle range within which the camera 140 can rotate is less than or equal to 180°. For example, the angle range may be 120°, and the camera 140 may rotate within an angle range of 120° in front of the display 120. In combination with an angle of view of the camera 140, basically, all images within a range of 180° in front of the smart television can be captured.

In some embodiments, as shown in FIG. 1 and FIG. 2, the electronic device 10 further includes a directional microphone 150, and the directional microphone 150 is rotatable, to pick up an audio signal in a specific direction. After the electronic device 10 determines the target sound source direction, the directional microphone 150 may rotate to the target sound source direction, and perform directional sound pickup in the target sound source direction.

Because the directional microphone 150 can pick up sound in the target sound source direction without distortion, interference and reverberation can be suppressed to some extent. In addition, the directional microphone 150 picks up sound from the front, so that echo can also be well suppressed. Therefore, in this embodiment of this application, an audio signal obtained by using the directional microphone 150 and an audio signal obtained by using the microphone array 130 may be jointly used as an audio input of the voice quality enhancement model, to obtain or restore a clearer audio signal.

With reference to an embodiment in which the camera 140 can rotate to the target sound source direction to record a video in the target sound source direction, in an example, still as shown in FIG. 1 and FIG. 2, the directional microphone 150 may be disposed on the camera 140. For example, the directional microphone 150 is fastened to the camera 140. When the camera 140 rotates to the target sound source direction, the directional microphone 150 also rotates to the target sound source direction. An implementation is simple and convenient. The electronic device 10 further includes a processor (not shown in the figure). The display 120, the microphone array 130, the camera 140, and the directional microphone 150 are all connected to the processor, to input, to the processor for subsequent processing, a signal captured by each component. The processor runs instructions to implement the signal processing method in embodiments of this application, to obtain a clear audio signal initiated by the user. After performing speech recognition on the audio signal, the processor may control a corresponding component to execute an instruction corresponding to the audio signal.

It should be understood that the foregoing structure of the electronic device 10 described by using the smart television as an example is merely an example for description, and the electronic device 10 may have more or fewer components.

In some embodiments, the electronic device 10 may include a microphone array 130 and a camera 140. Optionally, the electronic device 10 may further include a directional microphone 150, but the electronic device 10 may not include a display 120.

In some other embodiments, the electronic device 10 may include a directional microphone 150 and a camera 140, but the electronic device 10 does not include a microphone array 130. In this embodiment, a target sound source direction may be determined by using an audio signal picked up by the directional microphone 150 and a video recorded by the camera 140. In addition, a video in the target sound source direction is recorded by using the camera 140, and an audio signal in the target sound source direction is picked up by using the directional microphone 150, to restore a clear audio signal by using the video in the target sound source direction and the voice quality enhancement model. For example, before the target sound source direction is determined, the directional microphone 150 may keep rotating to capture an audio signal.

In some other embodiments, in addition to the microphone array 130, the camera 140, and the directional microphone 150, the electronic device 10 may further include more other components. For example, the electronic device 10 may be a device such as a mobile phone or a computer.

Figure 4:
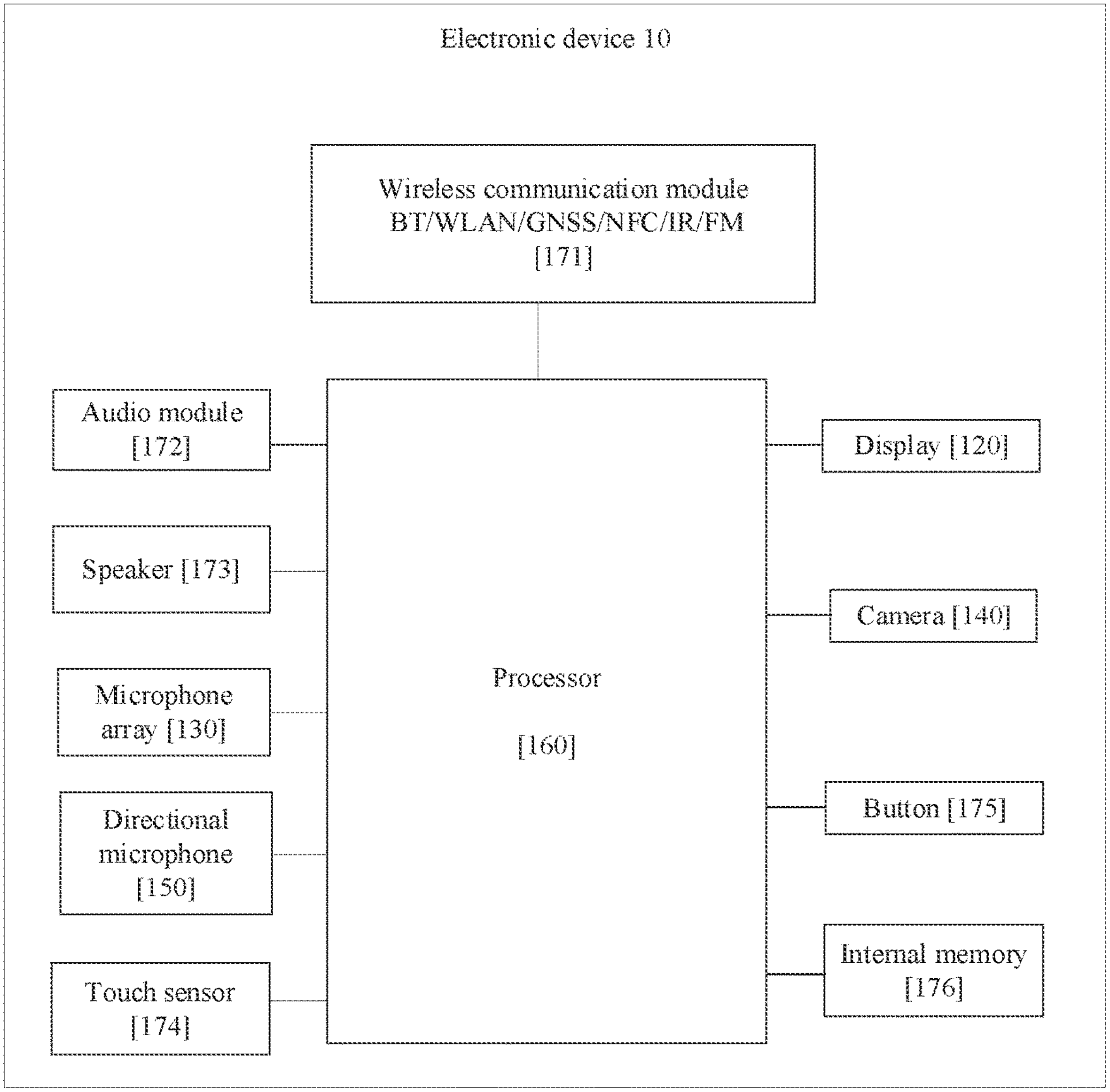
FIG. 4 is an example block diagram of an electronic device according to an embodiment of this application.

FIG. 4 is an example block diagram of an electronic device 10 according to an embodiment of this application. The electronic device 10 may include the display 120, the microphone array 130, the directional microphone 150, and the camera 140 shown in FIG. 3. For example, the electronic device 10 may further include one or more of the following components: a processor 160, a wireless communication module 171, an audio module 172, a speaker 173, a touch sensor 174, a button 175, and an internal memory 176.

The wireless communication module 171 may provide a wireless communication solution that is applied to the electronic device 10 and that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation. FM), a near field communication (near field communication, NFC) technology, an infrared (infrared, IR) technology, or the like. The wireless communication module 171 may be one or more devices integrating at least one communication processor module. The wireless communication module 171 receives an electromagnetic wave through the antenna, performs frequency modulation and filtering processing on an electromagnetic wave signal, and sends a processed signal to the processor. The wireless communication module 171 may further receive a to-be-sent signal from the processor, perform frequency modulation and amplification on the signal, and convert the signal into an electromagnetic wave for radiation through the antenna.

The audio module 172 is configured to convert digital audio information into an analog audio signal output, and is also configured to convert an analog audio input into a digital audio signal. The audio module 172 may be further configured to encode and decode an audio signal. In some embodiments, the audio module 172 may be disposed in the processor, or some functional modules of the audio module 172 are disposed in the processor 160.

The speaker 173, also referred to as a “loudspeaker”, is configured to convert an electrical audio signal into a sound signal. The electronic device 10 may listen to sound in music or a video by using the speaker 173. In an embodiment in which the electronic device 10 is a mobile phone, the speaker 173 may be further configured to listen to a hands-free call.

The touch sensor 174 is also referred to as a “touch panel”. The touch sensor 174 may be disposed on the display 120, and the touch sensor 174 and the display 120 form a touchscreen, which is also referred to as a “touch control screen”. The touch sensor 174 is configured to detect a touch operation performed on or near the touch sensor. The touch sensor 174 may transmit the detected touch operation to the processor 160 to determine a type of a touch event. A visual output related to the touch operation may be provided by using the display 120. In some other embodiments, the touch sensor 174 may alternatively be disposed on a surface of the electronic device 10 at a location different from a location of the display 120.

The button 175 includes a power button, a volume button, and the like. The button 175 may be a mechanical button or a touch button. The electronic device 10 may receive an input on the button 175, and generate a button signal input related to user settings and function control of the electronic device 10.

The internal memory 176 may be configured to store computer-executable program code. The executable program code includes instructions. The processor 160 implements various function applications and data processing of the electronic device 10 by running the instructions stored in the internal memory. The internal memory 176 may include a program storage area and a data storage area. The program storage area may store an operating system, an application required by at least one function (for example, a sound playing function or an image playing function), and the like. The data storage area may store data (such as audio data and an address book) and the like that are created during use of the electronic device 10. In addition, the internal memory 176 may include a high-speed random access memory, or may include a nonvolatile memory, for example, at least one magnetic disk storage device, a flash memory, or a universal flash storage (universal flash storage, UFS).

Figure 5:
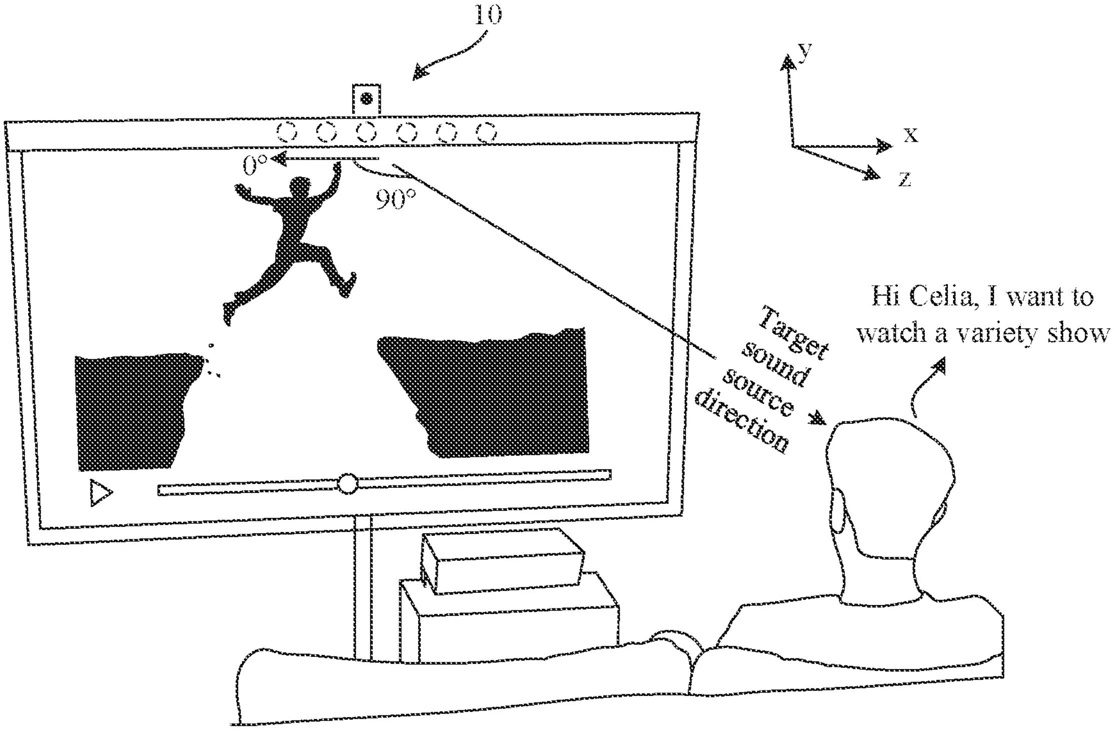
FIG. 5 is a schematic diagram of a scenario according to an embodiment of this application.

FIG. 5 is a schematic diagram of a scenario according to an embodiment of this application. A smart television is still used as an example. As shown in FIG. 5, a target user is watching television, and says “Hi Celia, I want to watch a variety show” to the smart television. The smart television receives and recognizes the instruction, to switch the smart television to a variety show.

In this embodiment of this application, for ease of description, a direction may be represented by using an angle. A reference direction may be defined, and an included angle between a direction and the reference direction is used to represent the direction. It should be understood that the reference direction may be any direction. This is not limited in this embodiment of this application.

FIG. 5 is used as an example. For example, in a length direction (for example, an x direction) of the electronic device 10, a direction extending along a left side (a direction indicated by an arrow in a direction corresponding to 0° in the figure) is denoted as a reference direction, an angle corresponding to the reference direction is 0°, the target user directly faces the electronic device 10, and an included angle between a target sound source direction in which the target user is located and the reference direction is 90°.

The following describes a signal processing method in embodiments of this application with reference to FIG. 6 to FIG. 9. The method may be performed by an electronic device 10. The electronic device 10 includes a microphone array 130, a camera 140, and a processing unit 160. For example, the processing unit 160 may include a target sound source direction determining module 161 and a voice quality enhancement module 162. Optionally, the electronic device 10 further includes a directional microphone 150.

Figure 6:
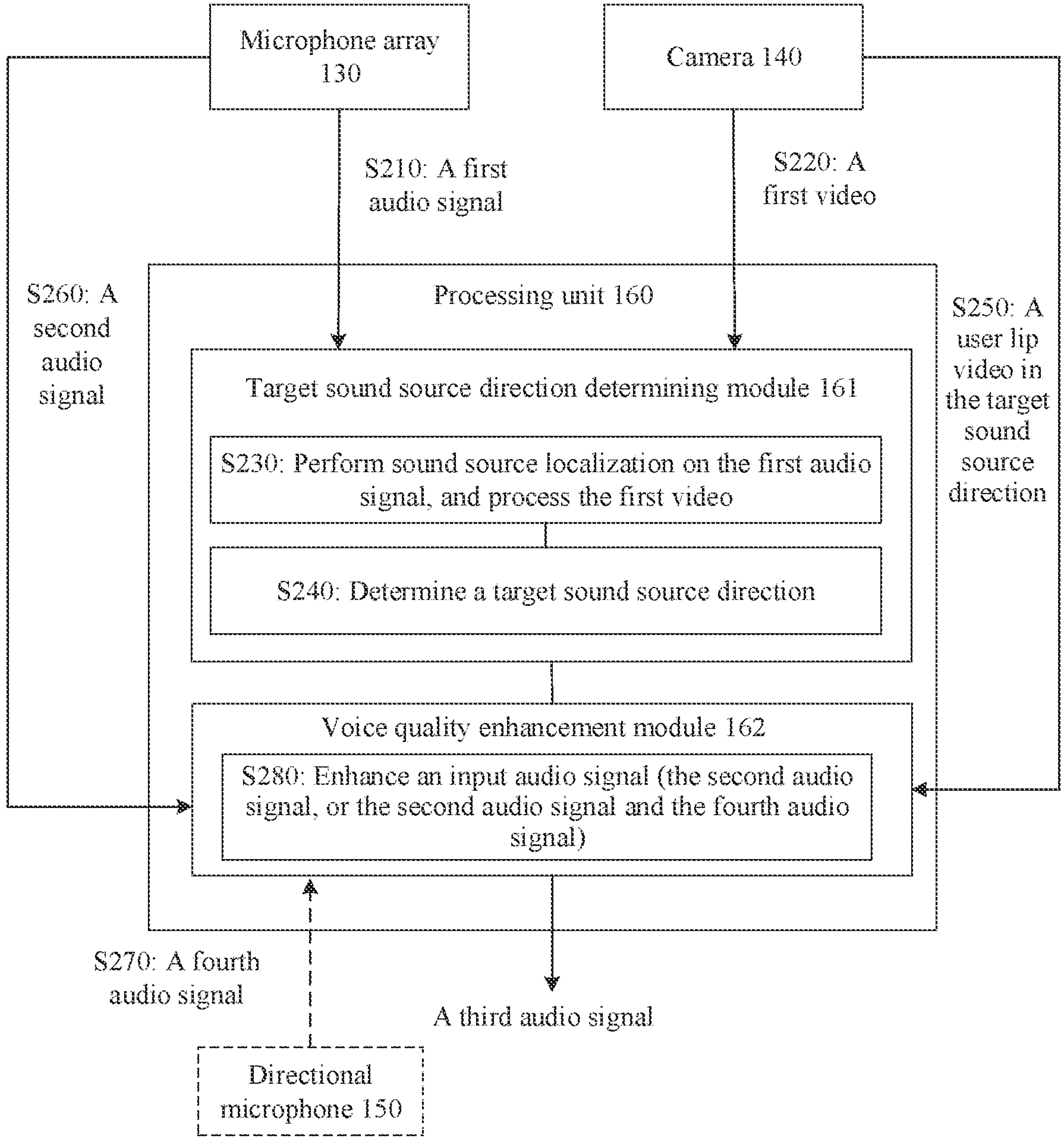
FIG. 6 is a schematic flowchart of a signal processing method according to an embodiment of this application.

FIG. 6 is a schematic flowchart of a signal processing method according to an embodiment of this application. As shown in FIG. 6, a general process of this embodiment of this application is as follows.

S210: A target user starts to initiate a speech instruction to the electronic device, and the microphone array 130 picks up a first audio signal.

S220: The camera 140 records a video to obtain a first video.

S230: The processing unit 160 performs sound source localization on the first audio signal to obtain sound source direction information including at least one sound source direction, and the processing unit 160 processes the first video to obtain user direction information. This step may be performed by the target sound source direction determining module 161 in the processing unit 160.

S240: The processing unit 160 determines, based on the sound source direction information and the user direction information, a target sound source direction in which the target user is located. This step may be performed by the target sound source direction determining module 161 in the processing unit 160.

S250: The processing unit 160 controls the camera 140 to rotate to the target sound source direction, and the camera 140 records a video in the target sound source direction, to obtain a user lip video in the target sound source direction.

S260: The microphone array 130 continues to pick up a second audio signal, where the second audio signal is a signal that actually requires speech recognition.

S270: In an embodiment in which the electronic device includes the directional microphone 150, the processing unit 160 may further control the directional microphone 150 to rotate to the target sound source direction, and the directional microphone 150 picks up a fourth audio signal in the target sound source direction.

In an embodiment in which the directional microphone 150 is disposed on the camera 140, the processing unit 160 controls the camera 140 and the directional microphone 150 to jointly rotate to the target sound source direction.

S280: The processing unit 160 performs voice quality enhancement on the second audio signal by using a voice quality enhancement model and by using the second audio signal and the user lip video in the target sound source direction as an input, to obtain an enhanced clear third audio signal. This step may be performed by the voice quality enhancement module 162 in the processing unit 160.

In an embodiment in which the electronic device includes the directional microphone 150, in S280, the processing unit 160 performs voice quality enhancement on the second audio signal and the fourth audio signal by using the voice quality enhancement model and by using the second audio signal, the fourth audio signal, and the user lip video in the target sound source direction as an input, to obtain a third audio signal.

It should be understood that sequence numbers of the foregoing processes do not mean execution sequences in embodiments of the method 200 this application. The execution sequences of the processes should be determined based on functions and internal logic of the processes, and should not be construed as any limitation on implementation processes of embodiments of this application. For example, step S210 and step S220 may be simultaneously performed, step S250 and step S260 may be simultaneously performed, and step S250, step S260, and step S270 may be simultaneously performed. For another example, step S250 may be performed before step S260, or may be performed after step S260.

In the signal processing method in this embodiment of this application, the first video is obtained by using the camera, and the target sound source direction in which the target user performing speech interaction with the electronic device is located is determined based on the first audio signal obtained by using the microphone array, so that estimation accuracy of the target sound source direction can be greatly improved. This prevents a false sound source generated due to strong reflected sound when the target sound source direction is determined only by using an audio signal from interfering with the determining of the target sound source direction. In addition, by using the preset voice quality enhancement model and the user lip video obtained in the target sound source direction by using the camera, voice quality enhancement is performed on the second audio signal obtained by using the microphone array. Because the voice quality enhancement model integrates a correspondence between a semantic meaning and a lip shape, the clean third audio signal can be restored based on the user lip video and the voice quality enhancement model, and finally, speech recognition efficiency can be effectively improved.

In addition, the directional microphone suppresses reverberation, interference beyond the target sound source direction, and echo of a display to some extent, and further suppresses residual echo after echo cancellation is performed. Therefore, in this embodiment of this application, the fourth audio signal picked up in the target sound source direction by using the directional microphone is combined with the second audio signal obtained by using the microphone array, and the two audio signals are used as an audio input. This can greatly improve sound pickup enhancement effects, to improve speech recognition efficiency.

Figure 7:
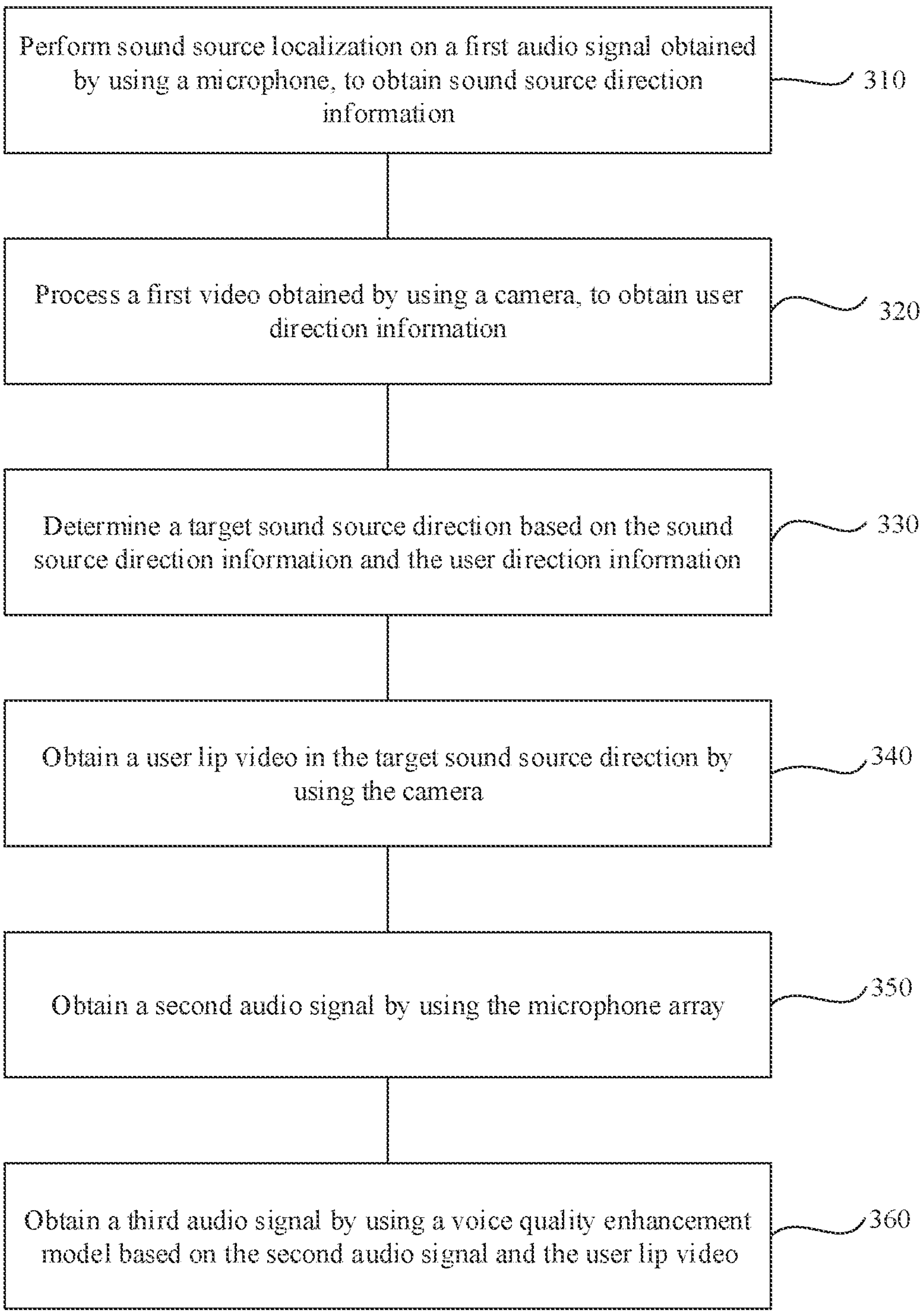
FIG. 7 is a schematic flowchart of a signal processing method according to another embodiment of this application.

FIG. 7 is a schematic flowchart of a signal processing method 300 according to another embodiment of this application. The method may be performed by the processing unit 160 of the electronic device 10.

In step S310, sound source localization is performed on a first audio signal obtained by using the microphone array 130, to obtain sound source direction information. The sound source direction information includes at least one sound source direction. The at least one sound source direction includes a target sound source direction.

A user initiates a speech instruction to the electronic device, and the microphone array 130 picks up an audio signal. This step may be used to perform sound source localization. The first audio signal may be a quite small portion of content in the speech instruction initiated by the user, and the quite small portion of content basically does not affect subsequent content used for speech recognition.

For example, the first audio signal may be a wake-up signal. For example, if the speech instruction initiated by the user is "Hi Celia, I want to watch a variety show", the first audio signal may be one or more words in "Hi Celia" or a plurality pieces of "Celia". The one or more words in "Celia" or the plurality pieces of "Celia" may be understood as a wake-up signal. The electronic device detects "Celia", and may determine that the user may require the electronic device to execute a speech instruction. The microphone array 130 performs sound source localization, and continuously picks up a subsequent audio signal.

Certainly, in a speech instruction without a wake-up signal, the first audio signal may be the first several words in the speech instruction. Usually, the microphone array 130 detects an audio signal provided that the user utters one or two words. For example, the speech instruction initiated by the user is "I want to watch a variety show", and the first audio signal may be "I".

The microphone array 130 performs sound source localization on the first audio signal, to determine a target sound source direction in which a target user is located, that is, a sound source direction in which the speech instruction is actually initiated. However, the microphone array 130 picks up audio signals in all directions. Due to impact of various types of interfering sound in an environment, a finally determined sound source direction is not necessarily accurate, and at least one sound source direction is obtained. The at least one sound source direction includes the target sound source direction, may further include a direction in which an interfering signal is located. For example, the target user initiates a speech instruction to the electronic device, a speaker is playing music, and another user (denoted as an interfering user) is speaking. It is assumed that all the foregoing three types of sound can be picked up by the microphone array 130. In this case, the microphone array 130 may determine three, two, or one sound source direction, and a result is inaccurate. Therefore, the target sound source direction needs to be further determined based on a video.

For example, a sound source localization technology in this embodiment of this application may be a controllable beamforming technology based on a maximum output power, a spectrum graph estimation technology based on a high resolution, or a sound source localization technology based on a sound time difference (time-delay estimation, TDE). This is not limited in this embodiment of this application.

As described above, a direction in this embodiment of this application may be represented by using an angle. Herein, a sound source direction may be represented by an angle θ. An angle corresponding to any one of the at least one sound source direction may be denoted as $\theta_i$, i=1, 2, . . . , I, where I is a quantity of sound source directions included in the at least one sound source direction.

In step S320, a first video obtained by using the camera 140 is processed to obtain user direction information. The user direction information includes some directions related to the user. For example, the user direction information includes at least one type of direction related to the user.

In some embodiments, the user initiates a speech instruction to the electronic device, the camera 140 may record a video, and the electronic device may be configured to determine the target sound source direction based on the obtained first video.

For example, the speech instruction initiated by the user may be used as a condition for triggering the camera 140 to record a video. The electronic device detects the speech instruction initiated by the user, and controls the camera 140 to start to record a video. The camera 140 in this embodiment of this application is rotatable. Therefore, in some examples, the camera 140 may record a video while rotating, to obtain images in a wider angle range.

In some other embodiments, during operating of the electronic device, the camera 140 may keep recording a video, and a video recorded within a period of time after the electronic device receives the speech instruction initiated by the user is used as the first video, to determine the target sound source direction.

The electronic device processes the first video recorded by using the camera 140, and detects user-related content in the first video to obtain the user direction information. The user direction information includes at least one type of direction related to the user. In this way, other interfering signals that are not produced by the user can be effectively excluded based on the sound source direction information in combination with the user direction information. For example, an interfering signal produced by the speaker can be excluded.

It should be understood that a user included in the user direction information includes not only the target user who is performing speech interaction with the electronic device, but also another user, provided that the user is detected in the first video. However, relative to the target user, the another user may be understood as an interfering user.

The user direction information includes at least one type of direction related to the user, and each type of direction includes at least one direction.

In some embodiments, the at least one type of direction includes at least one of the following:
- a first type of direction, where the first type of direction includes at least one direction in which a lip in a moving state is located;
- a second type of direction, where the second type of direction includes at least one direction in which a user is located; and
- a third type of direction, where the third type of direction includes at least one direction in which a user staring at the electronic device is located.

For the first type of direction, whether lips of a person in an image are moving, that is, whether a person is speaking, is detected by using the first video, so that a scenario in which a person is speaking, for example, in a video, can be effectively excluded. For an electronic device 10 with a display, a scenario in which an interfering user is speaking can also be excluded to some extent. For example, the target user is watching television and initiates a speech instruction to the television, and a user 1 is also speaking, but is doing housework with a head down and is not facing the television. In this case, no movement of lips of the user 1 is detected in most parts of the first video, and only movement of lips of the target user can be detected. Therefore, the user 1 is an interfering user, and can be effectively excluded.

If a plurality of users (including the target user) are speaking within a range of an angle of view of the camera 140 in an environment, movement of lips of the plurality of users may be detected, to obtain directions in which a plurality of lips in a moving state are located. In a normal case, the first type of direction includes the target sound source direction.

Herein, the first type of direction is represented by using an angle γ. An angle corresponding to any direction in the first type of direction may be denoted as $\gamma_l$, l=1, 2, . . . , L, where L is a quantity of directions included in the first type of direction.

For the second type of direction, a user appearing in an image is detected by using the first video, so that another interfering signal that is not initiated by the user can be effectively excluded. For example, an interfering signal initiated by the speaker can be excluded.

If there are a plurality of users (including the target user) in an environment, the plurality of users may be detected in the first video, to obtain directions in which the plurality of users are located. It should be understood that, in a normal case, the second type of direction includes the target sound source direction.

For ease of distinguishing, the second type of direction may be represented by using an angle α, and an angle corresponding to any direction in the second type of direction may be denoted as $\alpha_j$, j=1, 2, . . . , J, where J is a quantity of directions included in the second type of direction.

For the third type of direction, whether a user in an image is staring at the electronic device is detected by using the first video. Usually, especially for an electronic device with a display, if a user has an intention to interact with the electronic device, the user initiates a speech instruction to the electronic device in most cases. In this way, the electronic device can well receive the speech instruction, and the user can more quickly learn of whether the electronic device performs execution according to the instruction or obtain some feedbacks from the electronic device. For example, the user initiates a speech instruction to query for weather conditions, and the user needs to view weather conditions displayed on the electronic device. Therefore, a scenario in which an interfering user is speaking can be effectively excluded by detecting a user who is staring at the electronic device. For example, the target user is watching television and initiates a speech instruction to the television, and a user 1 is speaking to the target user, but is not staring at the television. In this case, in most parts of the first video, it is not detected that the user 1 is staring at the electronic device, and it can only be detected that the target user is staring at the electronic device. Therefore, the user 1 is an interfering user, and can be effectively excluded.

If there are a plurality of users (including the target user) in an environment, it may be detected in the first video that the plurality of users are staring at the electronic device, to obtain directions in which the plurality of users who are staring at the electronic device are located. In a normal case, the third type of direction includes the target sound source direction.

For ease of distinguishing, the third type of direction may be represented by using an angle β, and an angle corresponding to any direction in the third type of direction may be denoted as $\beta_k$, k=1, 2, . . . , K, where K is a quantity of directions included in the third type of direction.

It should be understood that the user direction information may include one, two, or three of the foregoing three types of directions. This is not limited in this embodiment of this application. Certainly, more types of directions included in the user direction information contribute to higher accuracy of determining the target sound source direction.

It should be further understood that, in addition to the foregoing three types of directions, the user direction information may further include another user-related direction. This is not limited in this embodiment of this application. For example, the user direction information may include another direction related to user behavior.

In step S330, the target sound source direction is determined based on the sound source direction information and the user direction information.

The target sound source direction is a direction in which the target user performing speech interaction with the electronic device is located.

It may be understood that the sound source direction in the sound source direction information may be considered as a type of direction, and is combined with the at least one type of direction related to the user to determine the target sound source direction.

Figure 8:
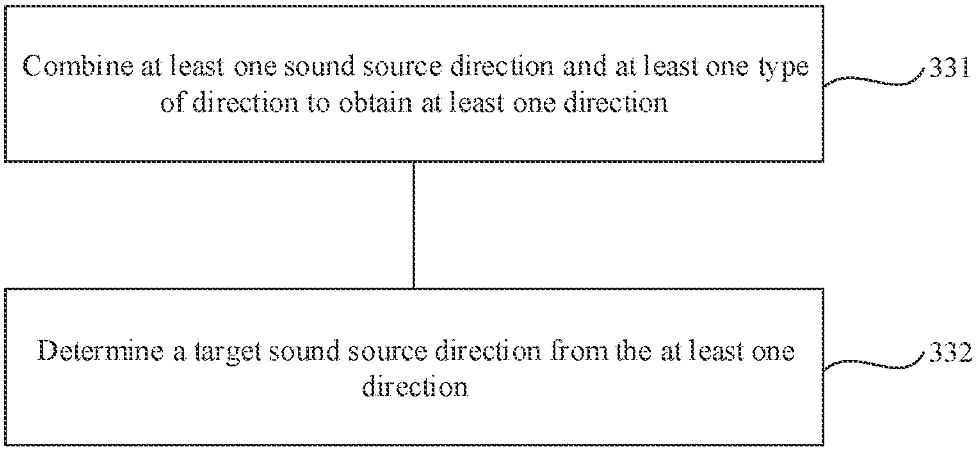
FIG. 8 is a schematic flowchart of a method for determining a target sound source direction by an electronic device according to another embodiment of this application.

FIG. 8 is a schematic flowchart of a method 230 for determining a target sound source direction by an electronic device according to another embodiment of this application.

In some embodiments, as shown in FIG. 8, the electronic device may determine a target sound source direction in the following manner.

In step S331, at least one sound source direction in sound source direction information is combined with at least one type of direction in user direction information to obtain at least one combined direction.

In step S332, a target sound source direction is determined from the at least one direction.

For ease of description, a manner of obtaining the at least one combined direction is first described below by using the sound source direction and the foregoing three types of directions as an example.

To simplify calculation during combination, if a deviation between angles corresponding to a plurality of directions is less than a threshold, one direction may be determined based on the plurality of directions. Logically, the plurality of directions may be considered as a same direction. A finally determined direction may be any one of the plurality of directions, or may be obtained by averaging the plurality of directions. This is not limited in this embodiment of this application. The threshold may be properly designed based on an actual application scenario. For example, the threshold may be 5°.

It is assumed that the sound source direction information includes four sound source directions, corresponding to angles 30°, 60°, 950, and 120° respectively; the first type of direction includes one direction, corresponding an angle 93°; the second type of direction includes two directions, corresponding to angles 63° and 95° respectively; and the third type of direction includes one direction, corresponding to an angle 95°.

The angles corresponding to all the directions are listed in ascending order as follows: 30°, 60°, 63°, 93°, 95°, 95°, 95°, and 120°. 60° and 63° are close or the same, and 93° and 95° are close or the same. A manner of averaging two directions is used as an example. Angles obtained through combination are 30°, 61.5°, 94.5°, and 120°, that is, the fourth type of direction obtained through combination includes four directions. The target sound source direction is one of the four directions. Actually, a direction corresponding to 94.5° is the target sound source direction. The target user is basically facing the electronic device and performing speech interaction with the electronic device.

After obtaining the at least one combined direction, the electronic device determines the target sound source direction from the at least one direction.

In this embodiment of this application, some parameters may be set based on a specific scenario of far-field sound pickup, and the target sound source direction is determined based on the parameters.

In some embodiments, in step S332, the electronic device may determine the target sound source direction from the at least one direction based on at least one parameter, where the at least one parameter includes:

total frequency at which each direction is detected in the sound source direction and the at least one type of direction;

whether the electronic device has successfully performed speech interaction with a user within a preset time period and a preset angle range corresponding to each direction, where the preset time period is a time period between a current time and a historical time, where the preset angle range includes an angle corresponding to each direction; and an included angle between each direction and a direction perpendicular to a display of the electronic device.

Each parameter is described by using an example in which the at least one type of direction includes the foregoing three types of directions and by using the angles corresponding to the foregoing four sound source directions and three types of directions as an example.

The four sound source directions correspond to angles 30°, 60°, 95°, and 120° respectively. The first type of direction includes one direction, corresponding an angle 93°. The second type of direction includes two directions, corresponding to angles 63° and 95° respectively. The third type of direction includes one direction, corresponding to an angle 95°. Angles that correspond to the four directions and that are obtained through combination are 30°, 61.5°, 94.5°, and 120°.

First parameter: total frequency at which each direction is detected in the sound source direction and the at least one type of direction.

Frequency at which 30° is detected in the sound source direction, the first type of direction, the second type of direction, and the third type of direction is 1, 0, 0, and 0 respectively, and total frequency is 1. Frequency at which 61.5° is detected in the sound source direction, the first type of direction, the second type of direction, and the third type of direction is 1, 0, 1, and 0 respectively, and total frequency is 2. Frequency at which 94.5° is detected in the sound source direction, the first type of direction, the second type of direction, and the third type of direction is 1, 1, 1, and 1 respectively, and total frequency is 4. Frequency at which 1200 is detected in the sound source direction, the first type of direction, the second type of direction, and the third type of direction is 1, 0, 0, and 0 respectively, and total frequency is 1. It can be learned that the total frequency at which 94.5° is detected in the sound source direction and the at least one type of direction is the highest.

It may be understood that a direction with higher total frequency of being detected is more likely to be the target sound source direction. In an ideal case, the direction is basically the target sound source direction.

Second parameter: whether the electronic device has successfully performed speech interaction with the user within a preset time period and a preset angle range corresponding to each direction, where the preset time period is a time period between a current time and a historical time, where the preset angle range includes an angle corresponding to each direction.

Angles in the preset angle range corresponding to each direction may include not only an angle corresponding to the direction, but also an angle near the angle. For example, if an angle corresponding to a direction is 30°, the preset angle range may be 25° to 35°. It should be understood that a smaller preset angle range indicates higher accuracy of a target sound source direction determined by using the parameter.

The preset time period is a time period between a current time and a historical time, and the historical time is a time earlier than the current time. Usually, duration of the preset time period should not be set to be excessively long. This helps determine the target sound source direction more accurately. For example, the duration of the preset time period may be set to 1 minute, 5 minutes, or 10 minutes. Assuming that the current time is 10:30 and the duration of the preset time period is 10 minutes, the historical time is 10:20, and the preset time period is a time period between 10:20 and 10:30.

In other words, the second parameter may be understood as whether the electronic device has successfully performed speech interaction with the user within the preset time period and near an angle corresponding to a specific direction.

In an actual scenario, a user is quietly likely to keep using an electronic device within a specific period of time. Especially for an electronic device with a display, for example, a smart television, the user basically does not frequently change a location when watching television. Therefore, if the electronic device has successfully performed speech interaction with the user within a preset time period and a preset angle range corresponding to a specific direction, it means that the direction is quite likely to be the target sound source direction; otherwise, the direction is less likely to be the target sound source direction. Further, higher frequency of successful speech interaction between the electronic device and the user indicates that the direction is more likely to be the target sound source direction; otherwise, the direction is less likely to be the target sound source direction.

Third parameter: an included angle between each direction and a direction perpendicular to the display of the electronic device.

The third parameter is applicable to an electronic device with a display. The direction perpendicular to the display of the electronic device may be understood as a thickness direction of the electronic device.

In an actual scenario, when watching a video, a user faces an electronic device (or a display) in front of the electronic device, to achieve good visual experience. Therefore, a smaller included angle between a direction and the direction perpendicular to the display of the electronic device means that the user is more likely to being facing the electronic device and watching a video, and therefore the user is quite likely to initiate a speech instruction. Therefore, the direction is more likely to be the target sound source direction. Otherwise, the direction is less likely to be the target sound source direction. In other words, a direction closer to the direction perpendicular to the display is more likely to be the target sound source direction.

In other words, the third parameter may be understood as whether the user is at a location near a specific direction defined when the electronic device is used in a preset scenario.

It should be understood that the electronic device may determine the target sound source direction based on one, two, or three of the foregoing parameters. This is not limited in this embodiment of this application. Descriptions are provided below.

In some embodiments, the at least one parameter includes the first parameter. To be specific, the at least one parameter includes total frequency at which each direction is detected in the sound source direction and the at least one type of direction. For example, in principle, a direction with highest total frequency of being detected in the sound source direction and the at least one type of direction may be used as the target sound source direction.

In some other embodiments, the at least one parameter includes the second parameter. To be specific, the at least one parameter includes whether the electronic device has successfully performed speech interaction with the user within a preset time period and a preset angle range corresponding to each direction. For example, in principle, a direction corresponding to an angle at which the electronic device has successfully performed speech interaction with the user within the preset time period and the preset angle range is determined as the target sound source direction.

In some other embodiments, the at least one parameter includes the third parameter. To be specific, the at least one parameter includes an included angle between each direction and a direction perpendicular to the display of the electronic device. For example, in principle, a direction having a smallest included angle with the direction perpendicular to the display of the electronic device may be determined as the target sound source direction.

In some other embodiments, the at least one parameter includes any two or three parameters. For example, for each parameter, one candidate sound source direction may be obtained according to the principle in the foregoing corresponding example, and a direction with a highest repetition rate among candidate sound source directions is used as the target sound source direction.

For example, the at least one parameter includes a first parameter and a second parameter. For the first parameter, a direction with highest total frequency of being detected in the sound source direction and the at least one type of direction is used as a candidate sound source direction, and it is assumed that the candidate sound source direction is 94.5°. For the second parameter, a direction corresponding to an angle at which the electronic device has successfully performed speech interaction with the user within a preset time period and a preset angle range is used as another candidate sound source direction, and it is assumed that the candidate sound source direction is 94.5°. In this case, a target sound source direction obtained based on the two candidate sound source directions is 94.5°.

In some other embodiments, the electronic device may determine a confidence of each direction based on the at least one parameter, and determine a direction corresponding to a maximum confidence value in the at least one direction as the target sound source direction. The confidence of each direction may also be referred to as reliability of each direction, and indicates a probability that the direction is the target sound source direction. A larger confidence indicates that a direction corresponding to the confidence is more likely to be the target sound source direction.

A manner of determining the target sound source direction by using the confidence is described by using an example in which the at least one parameter includes three parameters. It should be understood that a manner of determining the target sound source direction by using the confidence in an embodiment in which the at least one parameter includes one or two parameters is similar to that in an embodiment in which three parameters are included. Refer to the following descriptions. Details are not described again subsequently.

For example, a weighted value may be configured for each parameter based on priorities of the three parameters, and the target sound source direction is determined by calculating each direction and determining a confidence based on each parameter. For example, a direction corresponding to a maximum confidence value in the at least one direction may be determined as the target sound source direction.

For example, the priorities of the three parameters are sequentially as follows in descending order, a priority of a first parameter>a priority of a second parameter>a priority of a third parameter. Correspondingly, a weighted value of the first parameter>a weighted value of the second parameter>a weighted value of the third parameter.

The determining the target sound source direction based on the confidence of each direction is described still by using the angles corresponding to the foregoing four sound source directions and three types of directions as an example and by using the angles (30°, 61.5°, 94.5°, and 120°) corresponding to the combined four directions as an example.

It is assumed that the weighted value of the first parameter is 0.5, the weighted value of the second parameter is 0.3, and the weighted value of the third parameter is 0.2. For the first parameter, if each combined direction is detected in the sound source directions and the three types of directions, a score of 10 points is obtained each time the direction is detected. For the second parameter, if the electronic device has successfully performed speech interaction with the user within a preset time period and a preset angle range corresponding to a specific direction, a score of the direction is also 10 points. For the third parameter, if an included angle between a direction and the direction perpendicular to the display is less than a threshold, a score of the direction is also 10 points. For example, the threshold is 10°.

The four sound source directions correspond to angles 30°, 60°, 95° and 120° respectively. The first type of direction includes one direction, corresponding an angle 93°. The second type of direction includes two directions, corresponding to angles 63° and 95° respectively. The third type of direction includes one direction, corresponding to an angle 95°. Angles that correspond to the four directions and that are obtained through combination are 30°, 61.5°, 94.5°, and 120°.

At 30°, for the first parameter, 30° is detected only in the sound source directions, and therefore one 10-points may be obtained. For the second parameter and the third parameter, the conditions are not met, and therefore a score is 0, and a confidence is: 10×0.5=5.

At 61.5°, for the first parameter, 61.5° is detected in the sound source directions and the second type of direction, and therefore two 10-points, namely, 20 points, may be obtained. For the second parameter, speech interaction has been successfully performed with the electronic device once in a direction corresponding to 61.5°, and therefore one 10-points may be obtained. For the third parameter, the condition is not met, and therefore a score is 0, and a confidence is: 20×0.5+10×0.3=13.

At 94.5°, for the first parameter, 94.5° is detected in the sound source directions and the third type of direction, and therefore four 10-points, namely, 40 points, may be obtained. For the second parameter, speech interaction has been successfully performed with the electronic device once in a direction corresponding to 94.5°, and therefore one 10-points may be obtained. For the third parameter, 94.5°−90°=4.5°, where 4.5° is less than 10°, and the condition is met, and therefore one 10-points may be obtained, and a confidence is: 40×0.5+10×0.3+10×0.2=25.

At 10°, for the first parameter, 10° is detected only in the third type of direction, and therefore one 10-points may be obtained. For the second parameter and the third parameter, the conditions are not met, and therefore a score is 0, and a confidence is: 10×0.5=5.

To sum up, the confidence value of 94.5° is the largest. Therefore, a direction corresponding to 94.5° is determined as the target sound source direction.

In step S340, a user lip video in the target sound source direction is obtained by using the camera 140.

After the target sound source direction is determined, the electronic device rotates the camera 140 to the target sound source direction, and the camera 140 records a video in the target sound source direction, where the video includes a user lip video of the target user in the target sound source direction.

In step S350, a second audio signal is obtained by using the microphone array 130.

It should be understood that the second audio signal is a signal used to indicate an actual speech command. For example, it is assumed that, in an entire process, a speech instruction initiated by the target user is "Hi Celia, I want to watch a variety show". In this case, the second audio signal may be used to indicate the speech instruction "I want to watch a variety show".

To improve sound pickup effects, in some embodiments, the second audio signal is obtained in the target sound source direction by using the microphone array 130 based on a beamforming technology.

In step S360, a third audio signal is obtained based on the second audio signal and the user lip video by using a voice quality enhancement model, where the voice quality enhancement model includes correspondences between a plurality of semantic meanings and a plurality of lip shapes.

The voice quality enhancement model performs sound pickup enhancement on an audio signal, to enhance an audio signal in the target sound source direction, and suppresses or cancels an audio signal in another direction, so as to obtain or restore a clear audio signal. The voice quality enhancement model integrates audio and video information, and integrates a correspondence between a semantic meaning and a lip shape, that is, one or more semantic meanings correspond to one lip shape. The second audio signal is used as an audio input, and lip information in the target sound source direction is used as a video input. The voice quality enhancement model may enhance the audio signal based on the input user lip video and the correspondence between a semantic meaning and a lip shape, to obtain or restore the clear third audio signal for speech recognition. Compared with a manner in which an audio signal is processed only based on audio information, in the voice quality enhancement model in this embodiment of this application, an audio signal is processed by using audio and video information, so that a clean audio signal can be obtained, thereby greatly improving sound pickup enhancement effects.

For example, the voice quality enhancement module may perform noise reduction, residual echo cancellation, and dereverberation on the second audio signal.

Figure 9:
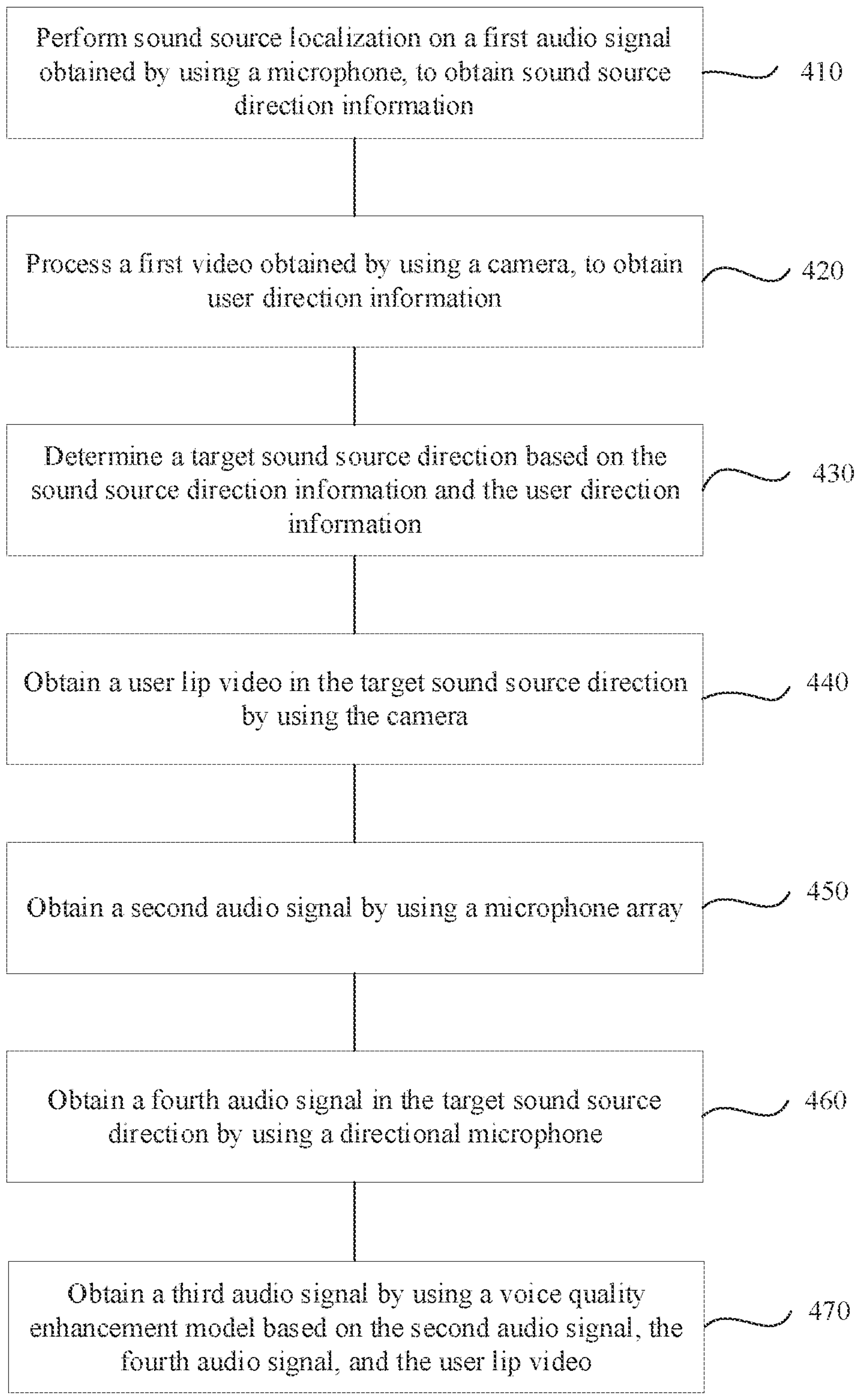
FIG. 9 is a schematic flowchart of a signal processing method according to another embodiment of this application.

FIG. 9 is a schematic flowchart of a signal processing method 400 according to another embodiment of this application. The method may be performed by the processing unit 160 of the electronic device 10.

In step S410, sound source localization is performed on a first audio signal obtained by using the microphone array 130, to obtain sound source direction information. The sound source direction information includes at least one sound source direction. The at least one sound source direction includes a target sound source direction.

For specific descriptions of step S410, refer to the foregoing related descriptions of step S310.

In step S420, a first video obtained by using the camera 140 is processed to obtain user direction information. The user direction information includes at least one type of direction related to a user.

For specific descriptions of step S420, refer to the foregoing related descriptions of step S320.

In step S430, a target sound source direction is determined based on the sound source direction information and the user direction information. The target sound source direction is a direction in which a target user performing speech interaction with the electronic device is located.

For specific descriptions of step S430, refer to the foregoing related descriptions of step S330.

In step S440, a user lip video in the target sound source direction is obtained by using the camera 140.

For specific descriptions of step S440, refer to the foregoing related descriptions of step S340.

In step S450, a second audio signal is obtained by using the microphone array 130.

For specific descriptions of step S450, refer to the foregoing related descriptions of step S350.

In step S460, a fourth audio signal in the target sound source direction is obtained by using the directional microphone 150.

After the electronic device determines the target sound source direction, the electronic device may control the directional microphone 150 to rotate to the target sound source direction and pick up the fourth audio signal in the target sound source direction.

In an embodiment in which the directional microphone 150 is disposed in the camera 140, the electronic device may control the camera 140 and the directional microphone 150 to jointly rotate together to the target sound source direction.

In step S470, a third audio signal is obtained by using a voice quality enhancement model based on the second audio signal, the fourth audio signal, and the user lip video.

In this step, the second audio signal picked up by the microphone array 130 and the fourth audio signal picked up by the directional microphone 150 are used as audio input of the voice quality enhancement model, the user lip video is used as a video input, and the voice quality enhancement module processes the input audio signals to obtain the clear third audio signal.

Because the directional microphone 150 can pick up sound in the target sound source direction without distortion, interference and reverberation can be suppressed to some extent. In addition, the directional microphone 150 picks up sound from the front, so that echo can also be well suppressed.

Therefore, the fourth audio signal obtained by using the directional microphone 150 and the second audio signal obtained by using the microphone array 130 are jointly used as an audio input of the voice quality enhancement model, to obtain or restore the clearer audio signal.

It should be understood that, similar to those in the method 200, sequence numbers of the foregoing processes do not mean execution sequences in embodiments of the methods 300 and 400. The execution sequences of the processes should be determined based on functions and internal logic of the processes, and should not be construed as any limitation on the implementation processes of embodiments of this application.

An embodiment of this application further provides an electronic device. The electronic device may be the electronic device shown in FIG. 4. The electronic device includes a microphone array 130, a rotatable camera 140, and a processor 160. The processor 160 is configured to:

- perform sound source localization on a first audio signal obtained by using the microphone array 130, to obtain sound source direction information;
- process a first video obtained by using the camera 140, to obtain user direction information;
- determine a target sound source direction based on the sound source direction information and the user direction information,
- obtain a user lip video in the target sound source direction by using the camera 140;
- obtain a second audio signal by using the microphone array 130; and obtain a third audio signal based on the second audio signal and the user lip video by using a voice quality enhancement model, where the voice quality enhancement model includes a correspondence between a semantic meaning and a lip shape.

Optionally, the electronic device further includes a directional microphone 150, and the processor 160 is further configured to:

obtain a fourth audio signal in the target sound source direction by using the directional microphone 150; and the processor 160 is specifically configured to:

obtain the third audio signal based on the second audio signal, the fourth audio signal, and the user lip video by using the voice quality enhancement model.

Optionally, the directional microphone 150 is fastened to the camera 140.

Optionally, the user direction information includes at least one of the following types of directions:

a first type of direction, where the first type of direction includes at least one direction in which lips in a moving state are located;

a second type of direction, where the second type of direction includes at least one direction in which a user is located; and a third type of direction, where the third type of direction includes at least one direction in which a user staring at the electronic device is located.

Optionally, the sound source direction information includes at least one sound source direction, and the processor 160 is specifically configured to:

combine the at least one sound source direction and the at least one type of direction to obtain at least one combined direction; and determine the target sound source direction from the at least one direction.

Optionally, the processor 160 is specifically configured to:

determine the target sound source direction from the at least one direction based on at least one parameter, where the at least one parameter includes:

total frequency at which each of the at least one direction is detected in the sound source direction and the at least one type of direction;

whether the electronic device has successfully performed speech interaction with a user within a preset time period and a preset angle range corresponding to each direction, where the preset time period is a time period between a current time and a historical time; and an included angle between each direction and a direction perpendicular to a display of the electronic device.

Optionally, the processor 160 is specifically configured to:

determine a confidence of each direction based on the at least one parameter; and determine a direction corresponding to a maximum confidence value in the at least one direction as the target sound source direction.

Optionally, the processor 160 is specifically configured to:

obtain the second audio signal in the target sound source direction by using the microphone array 130 based on a beamforming technology.

Optionally, the first audio signal is a wake-up signal.

Optionally, the electronic device is a smart television.

It should be understood that, in embodiments of this application, unless otherwise specified and limited, terms such as "connection" and "fixed connection" should be understood in a broad sense. A person of ordinary skill in the art may understand specific meanings of the foregoing terms in embodiments of this application based on a specific situation.

For example, the "connection" may be various connection modes such as a fixed connection, a rotatable connection, a flexible connection, a mobile connection, integral molding, and an electrical connection, may be a direct connection or an indirect connection through an intermediate medium, or may be an internal connection between two elements or an interaction relationship between two elements.

For example, for the "fixed connection", one element may be directly or indirectly fastened to another element. The fixed connection may include modes such as a mechanical connection, welding, and bonding. The mechanical connection may include modes such as riveting, a bolt connection, a threaded connection, a pin connection, a buckling connection, a locking connection, and plug-in. The bonding may include modes such as adhesive bonding and solvent bonding.

It should be further understood that "parallel" or "perpendicular" described in embodiments of this application may be understood as "approximately parallel" or "approximately perpendicular".

It should be further understood that orientations or location relationships indicated by the terms such as "length", "width", "thickness", "up", "down", "front", "rear", "left", "right", "vertical", "horizontal", "top", "bottom", "inside", and "outside" are based on orientations or location relationships shown in accompanying drawings, and are merely intended to facilitate description of this application and simplify description, but not to indicate or imply that an indicated apparatus or element needs to have a specific orientation or needs to be constructed or operated in a specific orientation, and therefore cannot be construed as a limitation on the present utility model.

It should be noted that the terms "first" and "second" are merely intended for a purpose of description, and shall not be understood as an indication or an implication of relative importance or an implicit indication of a quantity of indicated technical features. A feature limited by "first" or "second" may explicitly or implicitly include one or more features.

In this application, "at least one" means one or more, and "a plurality of" means two or more. "At least some of elements" means some or all of the elements. The term and/or describes an association relationship for describing associated objects and represents that three relationships may exist. For example, A and/or B may represent the following cases: Only A exists, both A and B exist, and only B exists, where A and B may be singular or plural. The character "/" usually indicates an "or" relationship between the associated objects.

A person of ordinary skill in the art may be aware that, in combination with examples described in embodiments disclosed in this specification, units and algorithm steps can be implemented by electronic hardware or a combination of computer software and electronic hardware. Whether the functions are performed by hardware or software depends on particular applications and design constraints of technical solutions. A person skilled in the art may use different methods to implement the described functions for each particular application, but it should not be considered that the implementation goes beyond the scope of this application.

It may be clearly understood by a person skilled in the art that, for convenience and brevity of description, for a detailed working process of the foregoing system, apparatus, and unit, reference may be made to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in an actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts shown as units may or may not be physical units, may be located in one place, or may be distributed on a plurality of network units. Some or all of the units may be selected according to an actual requirement to achieve objectives of solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, technical solutions of this application essentially, or the part contributing to the conventional technology, or some of technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The storage medium includes any medium that can store program code, for example, a USB flash drive, a removable hard disk, a read-only memory (read-only memory, ROM), a random access memory (random access memory. RAM), a magnetic disk, or an optical disc.

For same or similar parts in embodiments of this application, refer to embodiments. In embodiments of this application and implementations/implementation methods/execution methods of embodiments, unless there is a particular description or a logical conflict, terms and/or descriptions in different embodiments and implementations/implementation methods/execution methods of embodiments are consistent and may be mutually referenced. Technical features in different embodiments and implementations/implementation methods/execution methods of embodiments may be combined to form a new embodiment, implementation, implementation method, or execution method based on an internal logical relationship thereof. The foregoing implementations of this application do not constitute a limitation on the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A signal processing method, applied to an electronic device, wherein the electronic device comprises a microphone array and a camera, and the method comprises:

performing sound source localization on a first audio signal obtained by using the microphone array, wherein performing the sound source localization is used to obtain sound source direction information;

processing a first video obtained by using the camera, wherein processing the first video is used to obtain user direction information, the user direction information comprising at least one direction related to a user with respect to the camera;

determining a target sound source direction based on the sound source direction information and the user direction information;

obtaining a user lip video in the target sound source direction by using the camera;

obtaining a second audio signal by using the microphone array; and obtaining a third audio signal based on the second audio signal and the user lip video by using a voice quality enhancement model, wherein the voice quality enhancement model comprises a correspondence between a semantic meaning and a lip shape, wherein the user direction information comprises at least one of the following types of directions:

a first type of direction, wherein the first type of direction comprises at least one direction in which lips in a moving state are located;

a second type of direction, wherein the second type of direction comprises at least one direction in which a user looking at the electronic device is located; or a third type of direction, wherein the third type of direction comprises at least one direction in which a user is located, wherein the sound source direction information comprises at least one sound source direction, and wherein determining the target sound source direction based on the sound source direction information and the user direction information comprises:

combining the at least one sound source direction and the at least one type of direction to obtain at least one combined direction; and determining the target sound source direction from the at least one combined direction based on at least one parameter, wherein the at least one parameter comprises total frequency at which each of the at least one combined direction is detected in the sound source direction and the at least one type of direction.

2. The method according to claim 1, wherein the electronic device further comprises a directional microphone, and the method further comprises:

obtaining a fourth audio signal in the target sound source direction by using the directional microphone, wherein the obtaining a third audio signal based on the second audio signal and the user lip video in the target sound source direction by using a voice quality enhancement model comprises:

obtaining the third audio signal based on the second audio signal, the fourth audio signal, and the user lip video by using the voice quality enhancement model.

3. The method according to claim 1, wherein the determining the target sound source direction from the at least one combined direction comprises:

determining the target sound source direction from the at least one combined direction based on at least one parameter, wherein the at least one parameter further comprises at least one of:

a parameter indicating whether the electronic device has successfully performed speech interaction with a user within a preset time period and a preset angle range corresponding to each combined direction, wherein the preset time period is a time period between a current time and a historical time; or an included angle between each combined direction and a direction perpendicular to a display of the electronic device.

4. The method according to claim 3, wherein the determining the target sound source direction from the at least one combined direction based on at least one parameter comprises:

determining a confidence of each combined direction based on the at least one parameter; and determining a direction corresponding to a maximum confidence value in the at least one combined direction as the target sound source direction.

5. The method according to claim 1, wherein the obtaining a second audio signal by using the microphone array comprises:

obtaining the second audio signal in the target sound source direction by using the microphone array based on a beamforming technology.

6. The method according to claim 1, wherein the first audio signal is a wake-up signal.

7. An electronic device, comprising a microphone array, a camera, at least one processor, and one or more memories coupled to the at least one processor and storing programming instructions for execution by the at least one processor to:

perform sound source localization on a first audio signal obtained by using the microphone array, wherein performing the sound source localization is used to obtain sound source direction information;

process a first video obtained by using the camera, wherein processing the first video is used to obtain user direction information, the user direction information comprising at least one direction related to a user with respect to the camera;

determine a target sound source direction based on the sound source direction information and the user direction information;

obtain a user lip video in the target sound source direction by using the camera;

obtain a second audio signal by using the microphone array; and obtain a third audio signal based on the second audio signal and the user lip video by using a voice quality enhancement model, wherein the voice quality enhancement model comprises a correspondence between a semantic meaning and a lip shape, wherein the user direction information comprises at least one of the following types of directions:

a first type of direction, wherein the first type of direction comprises at least one direction in which lips in a moving state are located;

a second type of direction, wherein the second type of direction comprises at least one direction in which a user looking at the electronic device is located; or a third type of direction, wherein the third type of direction comprises at least one direction in which a user is located, wherein the sound source direction information comprises at least one sound source direction, and wherein the programming instructions are for execution by the at least one processor to:

combine the at least one sound source direction and the at least one type of direction to obtain at least one combined direction; and determine the target sound source direction from the at least one combined direction based on at least one parameter, wherein the at least one parameter comprises total frequency at which each of the at least one combined direction is detected in the sound source direction and the at least one type of direction.

8. The electronic device according to claim 7, wherein the electronic device further comprises a directional microphone, and the programming instructions are for execution by the at least one processor to:

obtain a fourth audio signal in the target sound source direction by using the directional microphone, wherein the programming instructions are for execution by the at least one processor to: obtain the third audio signal based on the second audio signal, the fourth audio signal, and the user lip video by using the voice quality enhancement model.

9. The electronic device according to claim 8, wherein the directional microphone is fastened to the camera.

10. The electronic device according to claim 7, wherein the programming instructions are for execution by the at least one processor to:

determine the target sound source direction from the at least one combined direction based on at least one parameter, wherein the at least one parameter further comprises at least one of:

a parameter indicating whether the electronic device has successfully performed speech interaction with a user within a preset time period and a preset angle range corresponding to each combined direction, wherein the preset time period is a time period between a current time and a historical time; or an included angle between each combined direction and a direction perpendicular to a display of the electronic device.

11. The electronic device according to claim 10, wherein the programming instructions are for execution by the at least one processor to:

determine a confidence of each combined direction based on the at least one parameter; and determine a direction corresponding to a maximum confidence value in the at least one combined direction as the target sound source direction.

12. The electronic device according to claim 7, wherein the programming instructions are for execution by the at least one processor to:

obtain the second audio signal in the target sound source direction by using the microphone array based on a beamforming technology.

13. The electronic device according to claim 7, wherein the first audio signal is a wake-up signal.

14. The electronic device according to claim 7, wherein the electronic device is a smart television.

15. A non-transitory computer-readable storage medium applied to an electronic device, wherein the electronic device comprises a microphone array and a camera, and wherein the non-transitory computer-readable storage medium stores programming instructions for execution by at least one processor, that when executed by the at least one processor, cause a computer to perform operations comprising:

performing sound source localization on a first audio signal obtained by using the microphone array, wherein performing the sound source localization is used to obtain sound source direction information;

processing a first video obtained by using a camera, wherein processing the first video is used to obtain user direction information, the user direction information comprising at least one direction related to a user with respect to the camera;

determining a target sound source direction based on the sound source direction information and the user direction information;

obtaining a user lip video in the target sound source direction by using the camera;

obtaining a second audio signal by using the microphone array; and obtaining a third audio signal based on the second audio signal and the user lip video by using a voice quality enhancement model, wherein the voice quality enhancement model comprises a correspondence between a semantic meaning and a lip shape, wherein the user direction information comprises at least one of the following types of directions:

a first type of direction, wherein the first type of direction comprises at least one direction in which lips in a moving state are located;

a second type of direction, wherein the second type of direction comprises at least one direction in which a user looking at the electronic device is located; or a third type of direction, wherein the third type of direction comprises at least one direction in which a user is located, wherein the sound source direction information comprises at least one sound source direction, and wherein determining the target sound source direction based on the sound source direction information and the user direction information comprises:

combining the at least one sound source direction and the at least one type of direction to obtain at least one combined direction; and determining the target sound source direction from the at least one combined direction based on at least one parameter, wherein the at least one parameter comprises total frequency at which each of the at least one combined direction is detected in the sound source direction and the at least one type of direction.

16. The non-transitory computer-readable storage medium according to claim 15, wherein the electronic device further comprises a directional microphone, and the operations further comprise:

obtaining a fourth audio signal in the target sound source direction by using the directional microphone, wherein the obtaining a third audio signal based on the second audio signal and the user lip video in the target sound source direction by using a voice quality enhancement model comprises:

obtaining the third audio signal based on the second audio signal, the fourth audio signal, and the user lip video by using the voice quality enhancement model.

17. The non-transitory computer-readable storage medium according to claim 15, wherein the determining the target sound source direction from the at least one combined direction comprises:

determining the target sound source direction from the at least one combined direction based on at least one parameter, wherein the at least one parameter further comprises at least one of:

a parameter indicating whether the electronic device has successfully performed speech interaction with a user within a preset time period and a preset angle range corresponding to each combined direction, wherein the preset time period is a time period between a current time and a historical time; or an included angle between each combined direction and a direction perpendicular to a display of the electronic device.

18. The non-transitory computer-readable storage medium according to claim 17, wherein the determining the target sound source direction from the at least one combined direction based on at least one parameter comprises:

determining a confidence of each combined direction based on the at least one parameter; and determining a direction corresponding to a maximum confidence value in the at least one combined direction as the target sound source direction.

19. The non-transitory computer-readable storage medium according to claim 15, wherein the obtaining a second audio signal by using the microphone array comprises:

obtaining the second audio signal in the target sound source direction by using the microphone array based on a beamforming technology.

20. The non-transitory computer-readable storage medium according to claim 15, wherein the first audio signal is a wake-up signal.

* * * * *